(12) United States Patent
Le Fur

(10) Patent No.: US 11,474,931 B2
(45) Date of Patent: Oct. 18, 2022

(54) DEBUGGING A CROSS-TECHNOLOGY AND CROSS-ENVIRONMENT EXECUTION

(71) Applicant: SAP SE, Walldorf (DE)

(72) Inventor: Kevin Le Fur, Paris (FR)

(73) Assignee: SAP SE, Walldorf (DE)

( * ) Notice: Subject to any disclaimer, the term of this patent is extended or adjusted under 35 U.S.C. 154(b) by 16 days.

(21) Appl. No.: 17/019,703

(22) Filed: Sep. 14, 2020

(65) Prior Publication Data
US 2022/0083456 A1 Mar. 17, 2022

(51) Int. Cl.
*G06F 11/36* (2006.01)
*G06F 9/451* (2018.01)
*H04L 67/10* (2022.01)

(52) U.S. Cl.
CPC .......... *G06F 11/3664* (2013.01); *G06F 9/451* (2018.02); *G06F 11/3636* (2013.01); *H04L 67/10* (2013.01)

(58) Field of Classification Search
CPC ........ G06N 20/00; G06N 5/04; G06F 3/0482; G06F 11/3664; G06F 9/451; G06F 11/3636; H04L 67/10
See application file for complete search history.

(56) References Cited

U.S. PATENT DOCUMENTS

| | | | | |
|---|---|---|---|---|
| 10,846,197 | B1* | 11/2020 | Bluestein | G06F 11/3624 |
| 2013/0305212 | A1* | 11/2013 | Reisbich | G06F 11/3664 |
| | | | | 717/102 |
| 2017/0300400 | A1* | 10/2017 | Davis | G06F 11/3636 |
| 2021/0286702 | A1* | 9/2021 | Grover | G06F 11/3636 |

OTHER PUBLICATIONS

Software engineering; What does artifact mean?; Software Engineering Stack Exchange; 4 pages; retrieved on May 18, 2021 (Year: 2011).*
Researcher Blog; What is an Artifact? Everything You Need to Know; Researcher Process; 12 pages; retrieved on May 18, 2021 (Year: 2020).*
David Poutakidis et al.; Debugging Multi-Agent Systems Using Design Artifacts The Case of Interaction Protocols; ACM; pp. 960-967; retrieved on Jun. 2, 2022. (Year: 2002).*
Alessandro Ricci et al.; Integrating Heterogeneous Agent Programming Platforms within Artifact-Based Environments; AAMAS; pp. 225-232; retrieved on Jun. 2, 2022 (Year: 2008).*

* cited by examiner

*Primary Examiner* — S. Sough
*Assistant Examiner* — Cuong V Luu
(74) *Attorney, Agent, or Firm* — Buckley, Maschoff & Talwalkar LLC

(57) ABSTRACT

Systems and methods include reception, at an artifact editor of a process automation system, user manipulations of an artifact editor user interface displayed on a client application of a local system, creation, by the artifact editor, of an artifact based on the received user manipulations, reception, at the artifact editor, second user manipulations of the artifact editor user interface displayed on the client application, the second user manipulations to initiate debugging of the artifact, instruction, by an artifact worker of the process automation system and in response to the second manipulations, an agent of the local system to execute the artifact, and presentation, by the artifact editor user interface displayed on the client application, debug information associated with the execution of the artifact.

20 Claims, 19 Drawing Sheets

DEBUGGING A CROSS-TECHNOLOGY AND CROSS-ENVIRONMENT EXECUTION

BACKGROUND

Software applications, executed on-premise or in the cloud, have profoundly increased the efficiency of many tasks. Current automated software workflow systems provide further benefits by allowing users to design and execute responsive software workflows with little or no human intervention. Such systems typically include multiple runtime environments, each executing different types of components as part of a single automated workflow.

According to the present description, processes are software artifacts which are asynchronous and executed in the cloud. Automations are also software artifacts, but are executed via an agent installed on a local machine (e.g., to control an application executing on the local machine to behave in a specified manner). Generally, an executing process may detect a particular condition and trigger execution of an automation in response.

Processes and automations may be edited graphically using a flowchart metaphor and drag-and-drop functional elements. Systems typically also provide a dedicated code editor for custom coding of functional elements. Therefore, in order to implement a workflow, a user generates several different software artifacts based on different development technologies. Some systems facilitate cross-technology artifact generation within a consistent design time environment.

Each different software artifact of a workflow must be debugged in order to confirm proper end-to-end execution of the workflow. However, since debugging of an artifact is performed within an execution environment corresponding to that artifact, the debugging of a workflow can be disjointed and inefficient. For example, in the case of a runtime environment including a JavaScript Node.js engine, artifacts written for this environment would conventionally be debugged independently, e.g., via the native V8 protocol of Node.js. Systems are desired to facilitate end-to-end debugging of a cross-technology and cross environment workflow.

DETAILED DESCRIPTION

The following description is provided to enable any person in the art to make and use the described embodiments. Various modifications, however, will remain readily-apparent to those in the art.

Some embodiments provide a unified debugging experience conforming to design-time artifact editing, regardless of execution technology protocol. For example, a user may operate a flowchart design editor to design a process and also to interactively debug its execution as it compiles into JavaScript and runs on Node.js. During debugging, artifact-specific workers may provide execution updates via events to a centralized repository that maintains information associated with debugging sessions.

Figure 1:
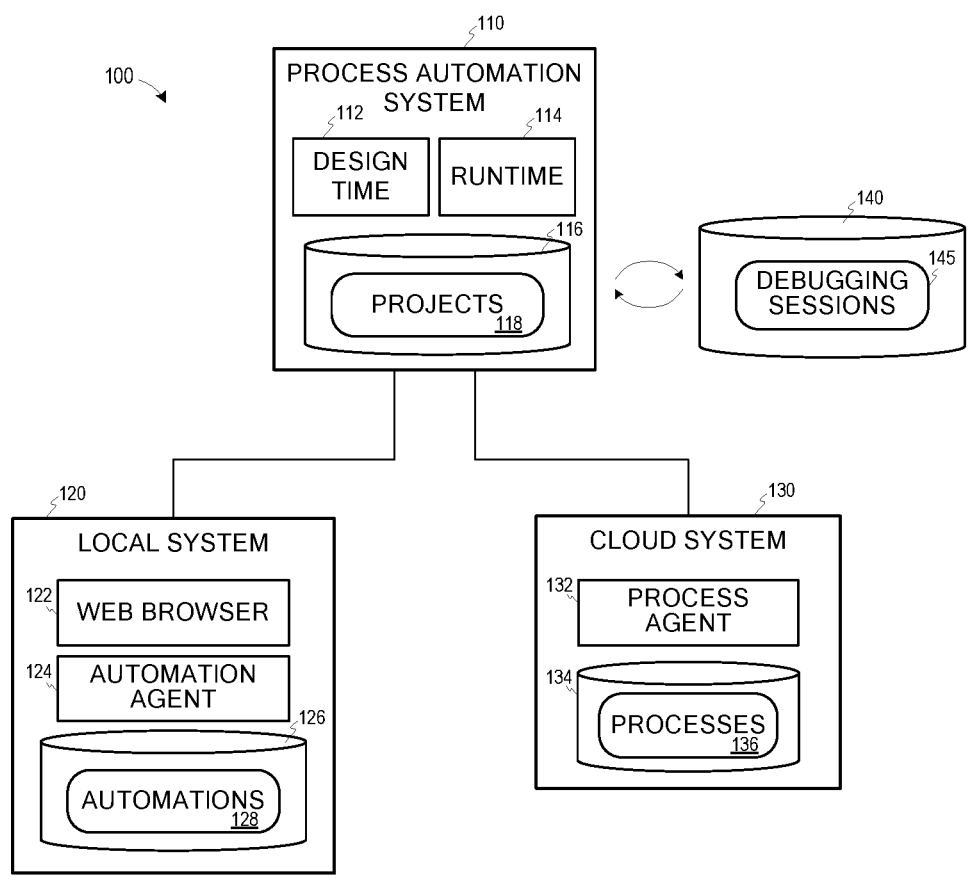
FIG. 1 is a block diagram of a process automation system architecture according to some embodiments.

FIG. 1 illustrates system 100 according to some embodiments. System 100 may provide process automation design and debugging according to some embodiments. Generally, process automation system 110 may provide orchestration for distributing software jobs to local system 120 for execution based on triggering initiated by cloud system 130. Process automation system 110 also provides for debugging of local and cloud-based software jobs (i.e., automations and processes) using a same user interface metaphor as used to create and edit the software jobs.

Process automation system 110 includes design time component 112 for providing user interfaces to client applications to create and edit artifacts such as automations and processes as described herein. Generally, automations and processes may be considered different artifacts and a workflow (or project) according to some embodiments may comprise artifact types in addition to processes and automations. Design time component 112 may provide any suitable user interfaces to facilitate development of artifacts that are or become known and may provide a different editor to Web browser 122 for editing each different artifact type. Process automation system 110 may store a set of interrelated artifacts as a project 118 within storage system 116.

Local system 120 includes processor-executable program code of Web browser 122 and automation agent 124. Web browser 122 may be executed to communicate with design time component 112 of process automation system 110. A user of local system 120 may therefore manipulate user interfaces provided to Web browser 122 by design time component 112 to create and edit project artifacts.

Runtime component 114 of system 110 may download automations 128 of a given project 118 to local system 120 for storage in storage device 126 as will be described herein. Automations 128 may comprise any data executable by automation agent 124 to cause local system 120 to perform intended activities. The intended activities may comprise executing one or more local applications (not shown) and instructing the one or more local applications to perform a set of tasks (e.g., extracting data from a spreadsheet, populating an e-mail with the extracted data and sending the e-mail). In some embodiments, an automation 128 may cause local system 120 to issue REST calls directly to cloud-based applications.

The activities of an automation may also or alternatively comprise operating Web browser 122 to access a Web page and submit data via the accessed Web page.

Cloud system 130 includes processor-executable program code of process agent 132. Runtime component 114 of system 110 may provide processes 136 to cloud system 130 from projects 118 for execution thereby. Processes 136 may comprise any data executable by process agent 132 to cause cloud system 130 to perform intended actions. Such actions may comprise but are not limited to detection of an event. Upon detection of such an event, runtime component 114 may trigger execution of a corresponding one or more automations 128 by automation agent 124.

Storage 140, which may or may not be a component of process automation system 110, stores data of debugging sessions 145 according to some embodiments. As will be described in detail below, debugging sessions 145 may comprise projects (i.e., sets of related artifacts) to be debugged and information supporting the debugging thereof. Advantageously, both design time component 112 and runtime component 114 may access debugging sessions 145 during debugging to facilitate usage of a design time artifact editing user interface as a debugging interface.

According to some embodiments, process automation system 110 communicates with many different local systems to facilitate editing of artifacts thereby and to orchestrate execution of automations thereon. Similarly, embodiments are not limited to a single cloud system for execution of processes.

Each of systems 110, 120 and 130 may comprise any suitable combination of hardware and/or software. Any components described herein may be implemented using a distributed storage system and/or distributed nodes for performing computing operations as is known in the art.

Figure 2:
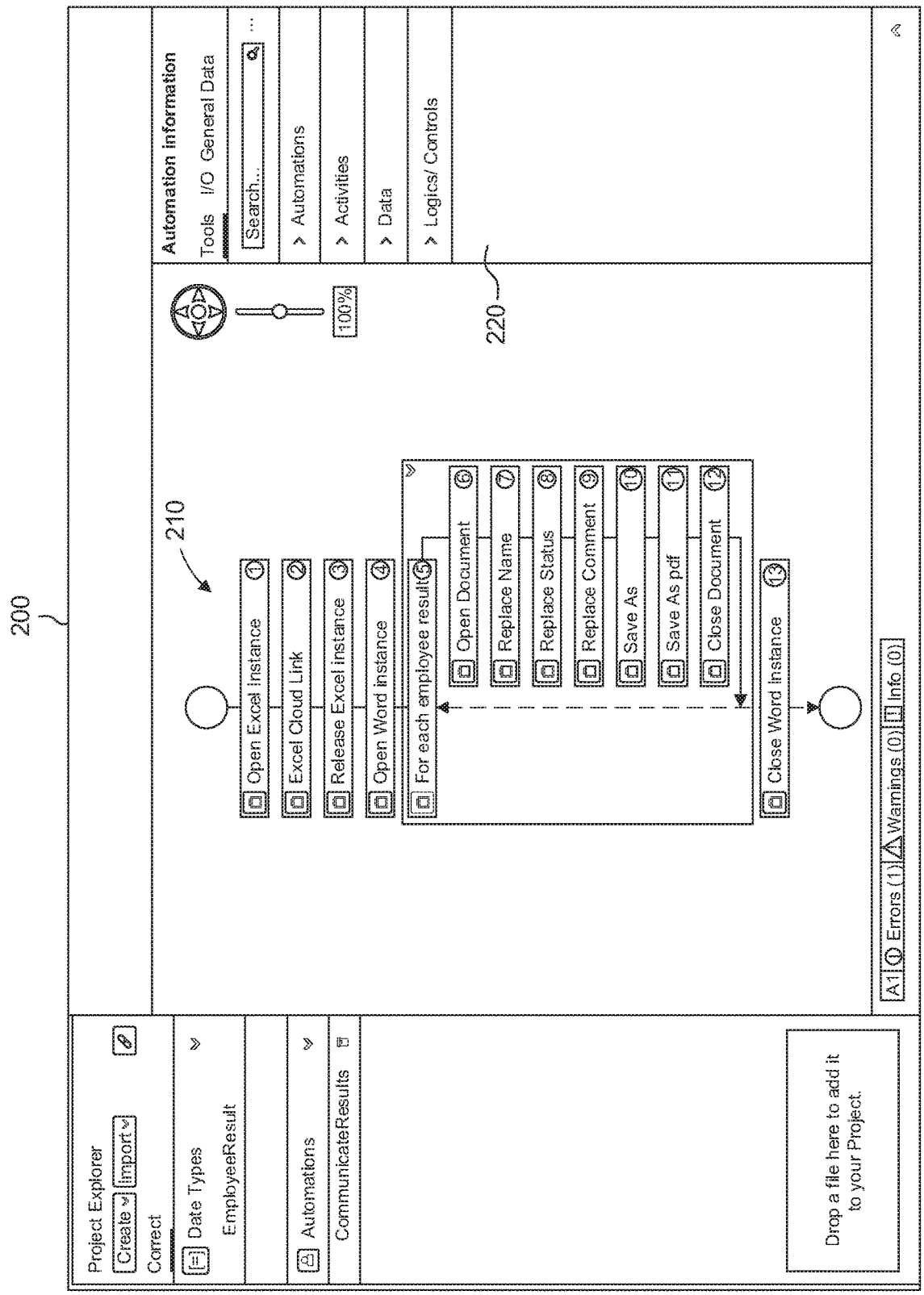
FIG. 2 is a view of an automation editor user interface according to some embodiments.

FIG. 2 is a view of automation editor user interface 200 according to some embodiments. User interface 200 may comprise a Web page provided by design time component 112 to Web browser 122 for display by local system 120. User interface 200 may be displayed by a dedicated client application for which design time component 112 is a corresponding server application.

According to some embodiments, a user may manipulate user interface 200 to create and edit project artifacts such as automations. Flow 210 is an example of a visual representation of an automation created using user interface 200 according to some embodiments. According to the example, a user selects activities from tools pane 220 and drags selected activities to appropriate positions of flow 210 to create flow 210. Some of the dragged activities may require configuration (e.g., data and/or field selection, input parameters).

Tools pane 220 allows selection of previously-created automations to include in a current automation, as well as data and logic/controls (e.g., for loops, decision branching). A step within an automation may comprise a user-scripted function according to some embodiments. In this regard, a user may invoke a code editor from user interface 200 in order to develop such a user-scripted function for inclusion into flow 210. As described herein, embodiments may facilitate debugging of automations using a design-time automation editor regardless of the nature of the specific elements of the automations.

Figure 3:
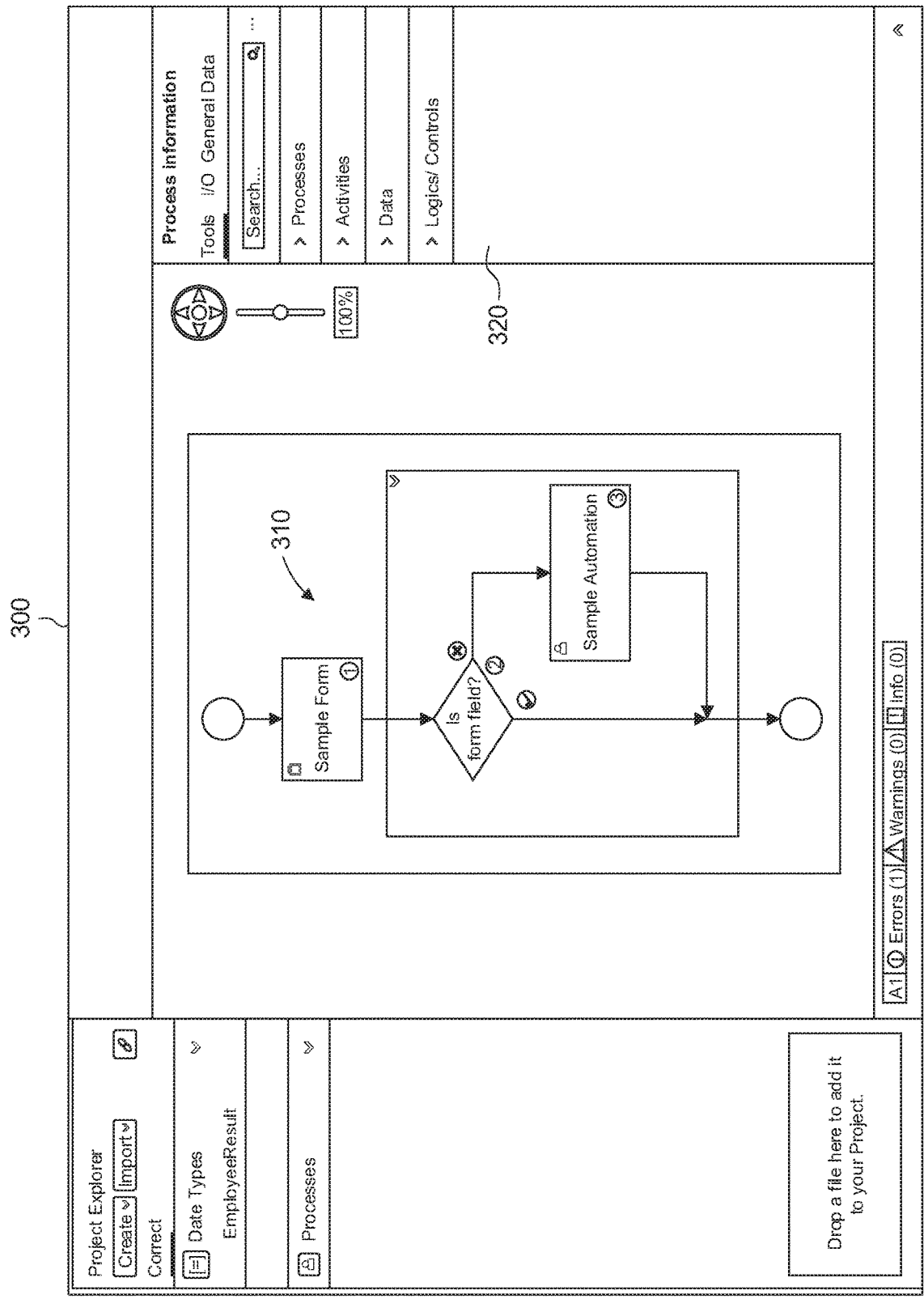
FIG. 3 is a view of a process editor user interface according to some embodiments.

FIG. 3 is a view of process editor user interface 300 to create and edit a process according to some embodiments. User interface 300 may comprise a Web page provided by design time component 112 to Web browser 122 for display by local system 120, or may be displayed by a dedicated client application for which design time component 112 is a corresponding server application.

Flow 310 is an example of a visual representation of a process to be executed by a process agent as described above. In the FIG. 3 example, a user selects activities from tools pane 320 and drags selected activities to appropriate positions of interface 300 to create flow 310. Flow 310 may also reference other types of project artifacts such as forms or other user tasks. As described with respect to flow 210, some of the activities of flow 310 may require configuration and user interface 300 provides functionality to facilitate such configuration.

Flow 310 may include data and logic/controls, and/or user-scripted functions according to some embodiments. A user may invoke a code editor from user interface 300 as described with respect to user interface 200 in order to develop user-scripted functions. Embodiments may facilitate debugging of processes using a design-time process editor such as user interface 300 even if the process includes user-scripted functions.

User interfaces 200 and 300 are example user interfaces according to some embodiments. Embodiments may employ any other suitable user interfaces to create and edit project artifacts that are or become known.

Figure 4:
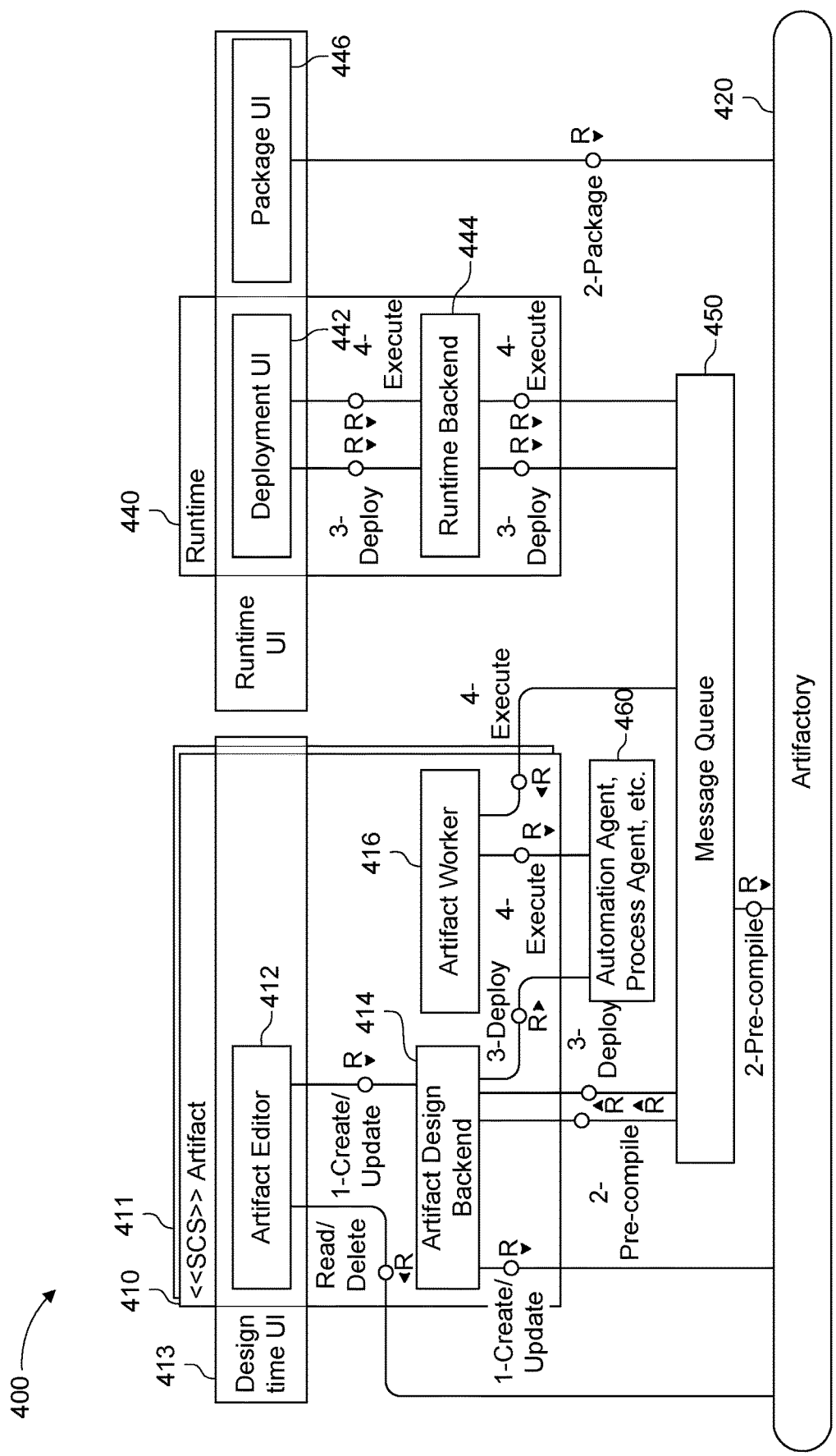
FIG. 4 illustrates execution within a process automation system architecture according to some embodiments.

FIG. 4 illustrates execution within a process automation system architecture according to some embodiments. Accordingly, process automation system 110 of FIG. 1 may implement architecture 400 of FIG. 4 to facilitate creation and execution of projects including automations, processes and other artifact types.

Each artifact type is handled by corresponding design time artifact component 410, 411. Embodiments are not limited to two artifact types. Artifact types include but are not limited to automations, processes, and data structures (e.g., data that can be passed as input to an automation or process). Each artifact component includes a dedicated artifact editor 412 (i.e., for editing artifacts of the artifact type associated with the artifact component) as part of the overall design time user interface 413.

Each artifact component 410, 411 includes an artifact design backend 414 for performing artifact type-specific operations and an artifact worker 416 which operates as an artifact type-specific runtime orchestrator. An artifact worker 416 provides an interface between design time user interface 413 and remote automation agents, process agents, etc. 460. In some embodiments, an artifact worker 416 may issue REST calls to perform functions without requiring an automation agent or process agent.

A user manipulates a client application (not shown) such as a Web browser to interact with artifact editors 412 of design time UI 413. The interaction may generate artifacts which are stored by corresponding artifact design backends 414 in artifactory 420.

Runtime component 440 includes package UI 446 and deployment UI 442 according to some embodiments. As illustrated in FIG. 4, a user may manipulate a client application (not shown) to instruct runtime component 440, via package UI 446, to generate a package consisting of a plurality of artifacts stored in artifactory 420. Artifactory 420 may then instruct artifact design backends 414 corresponding to the artifacts to pre-compile the artifacts in anticipation of subsequent deployment and execution.

In this regard, a user may also manipulate a client application (not shown) to instruct runtime backend 444 of runtime component 440, via deployment UI 442, to deploy a package. Since the package has been pre-compiled according to the present example, runtime backend 444 orchestrates the deployment by instructing corresponding artifact design backends 414 via message queue 450 to deploy the pre-compiled artifacts of the package. Artifact deployment may comprise downloading automations of the package to a local system (e.g., the local system of the user instructing the deployment) including an automation agent and transmitting processes of the package to a cloud system including a process agent as described above.

Next, the user may instruct runtime backend 444 via deployment UI 442 to execute a deployed package. Runtime backend 444 orchestrates the execution by instructing corresponding artifact workers 416 via message queue 450 to execute the deployed artifacts of the package. Artifact deployment may comprise downloading automations of the package to a local system (e.g., the local system of the user instructing the deployment) including an automation agent and transmitting processes of the package to a cloud system including a process agent. As described above, the processes may be executed to identify triggering conditions and to trigger execution of one or more automations in response.

Figure 5:
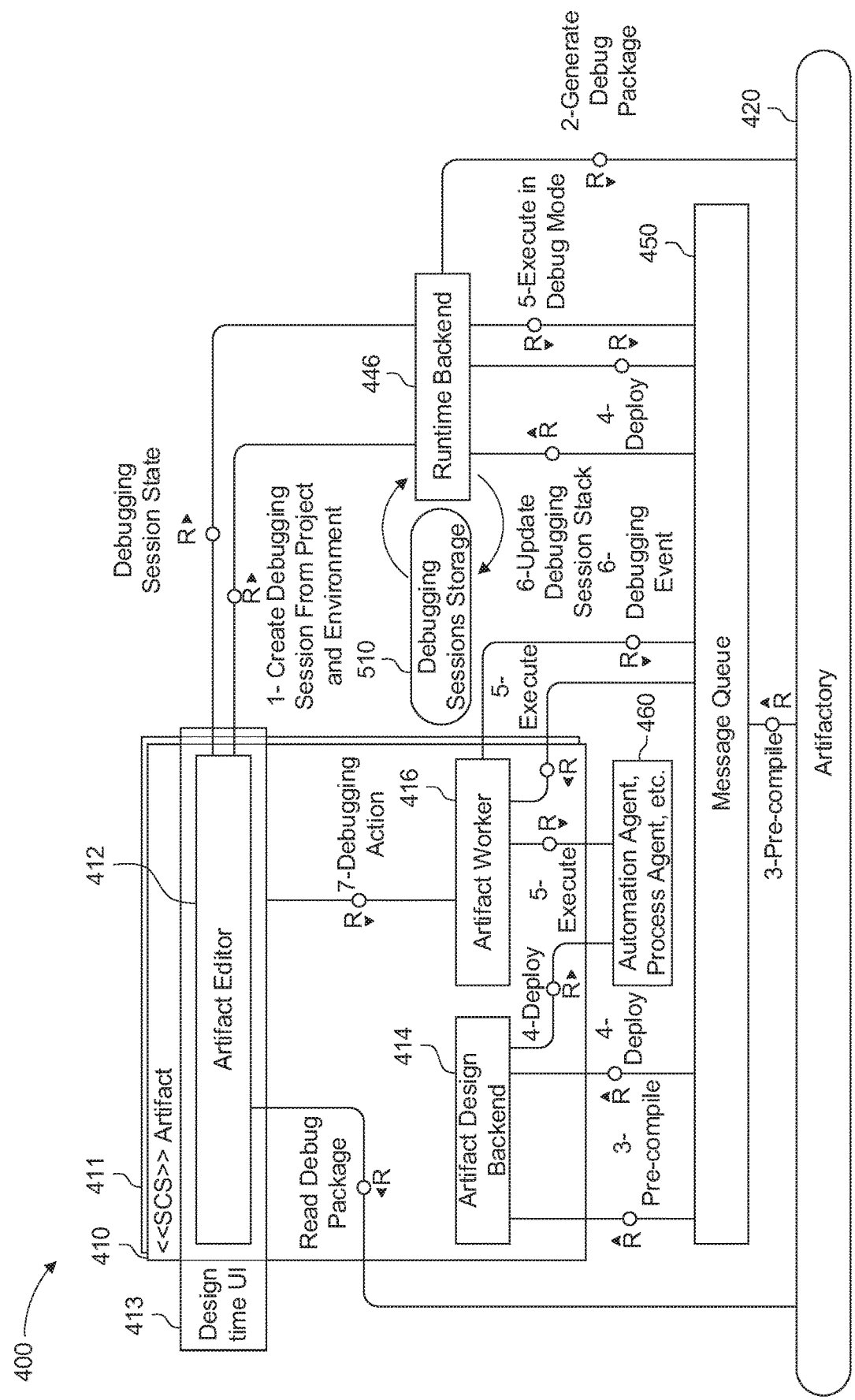
FIG. 5 illustrates debugging within a process automation system architecture according to some embodiments.

FIG. 5 illustrates debugging within a process automation system architecture according to some embodiments. Architecture 400 may therefore operate both as shown in FIG. 4 to create and execute projects and as shown in FIG. 5 to debug automations, processes and other artifact types in a unified manner.

To initiate a debug process according to some embodiments, a user manipulates a client application (not shown) such as a Web browser to interact with design time UI 413. The interaction may request reading of a package consisting of artifacts stored in artifactory 420. Upon receipt of the package, design time UI 413 requests runtime backend 446 to create a debug session based on the project and a runtime environment (e.g., defined variables needed by the execution, data replicated from design time system) associated with the project. Runtime backend 446 stores the debug session in storage 510.

Runtime backend 446 requests artifactory 420 to create a debug package associated with the debug session. The debug package is an immutable version of the project that cannot be modified, and is not visible to other users. The debug package is pre-compiled as described above with respect to FIG. 4.

Also as described above, runtime backend 446 may orchestrate the deployment of the pre-compiled debug package by instructing corresponding artifact design backends 414 via message queue 450 to deploy the pre-compiled artifacts of the debug package. Next, the user may instruct runtime backend 446 to instruct corresponding artifact workers 416 via message queue 450 to execute the deployed artifacts of the package in debug mode. Artifact workers 416 then instruct the corresponding remote system 460 to execute the subject artifacts.

Corresponding artifact workers 416 receive debugging events from remote system(s) 460 during artifact execution. The debugging events are sent to runtime 446 via message queue 450 to update the debugging session stack maintained in storage 510.

Debugging according to some embodiments may be interactive, in which design time UI 413 is operated to provide artifact workers 416 with debugging actions (e.g., set breakpoints, step through execution) which are used to govern execution of the artifacts by remote systems 460. Design time UI 413 receives debugging session state information (variable values, etc.) during such interactive debugging from runtime backend 446 for display to the user. Some embodiments support trace debugging in which design time UI 413 receives the stored debugging session state over time via runtime backend 446 and displays the stored state to the user after completion of the executions.

Figure 6:
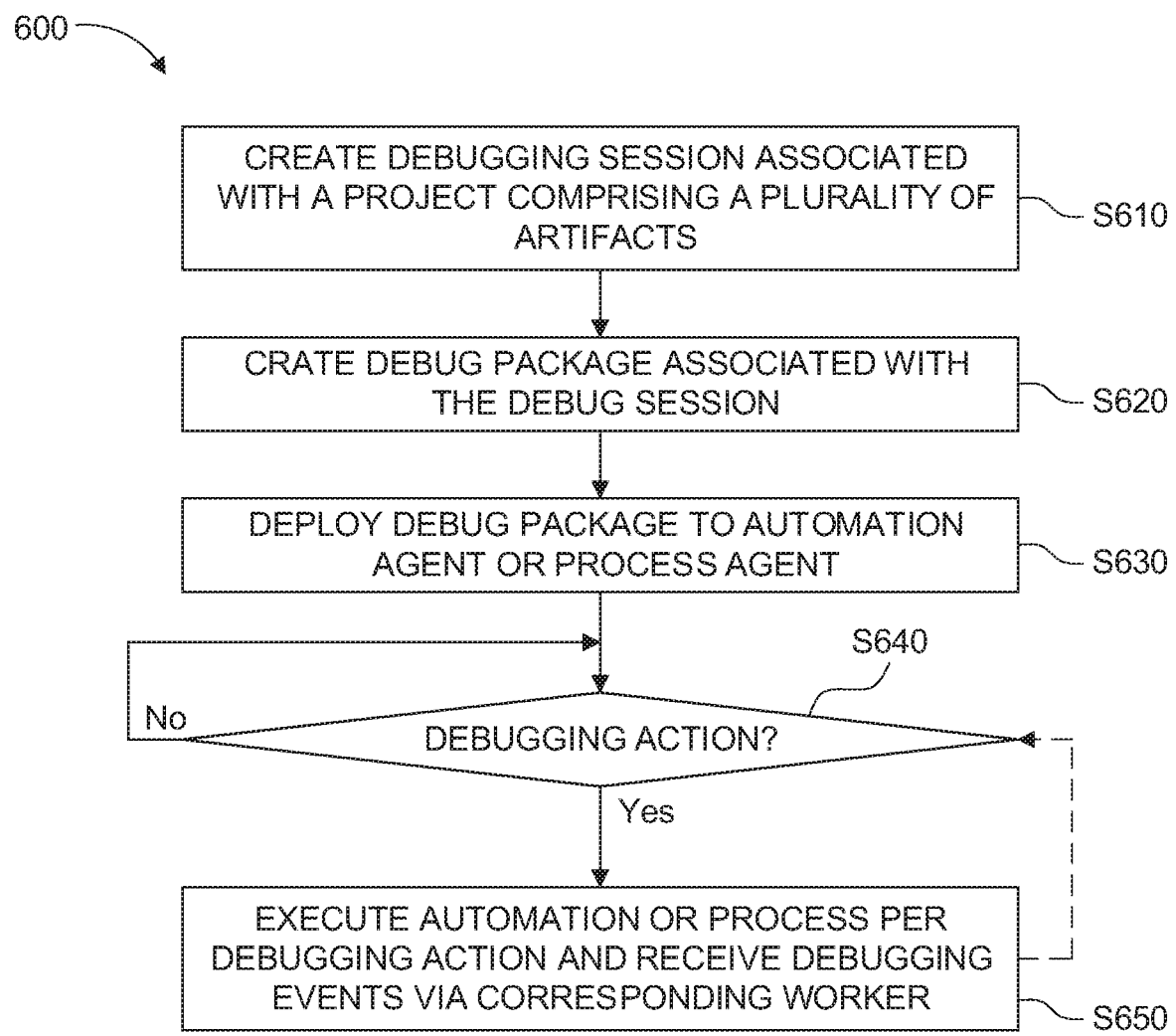
FIG. 6 is a flow diagram of debugging within a process automation system architecture according to some embodiments.

FIG. 6 is a flow diagram of debugging within a process automation system architecture according to some embodiments. Flow diagram 600 may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

According to some embodiments, a debugging session associated with a project is created at S610. The project may comprise a plurality of artifacts such as automations and processes as described above. The debugging session may be created by a cloud-based runtime backend which is also used to orchestrate execution of the artifacts during runtime. The debugging session may be created based on the plurality of artifacts and on aspects of a runtime environment (e.g., defined variables, data) required to execute the debug session.

A debug package associated with the debug session is created at S620. The debug package may comprise an immutable version of the project that cannot be modified, and which is not visible to other users. The debug package is deployed to an automation agent (e.g., on a local user machine) or to a process agent (e.g., on a cloud system) at S630. The debug package may be pre-compiled prior to deployment as described above.

Flow pauses at S640 until receipt of a debugging action. According to some embodiments, a debugging action may include an instruction received from a user via a design time UI to initiate execution of one or more artifacts of the deployed package. Flow proceeds to S650 upon receipt of such a debugging action to execute an automation of process and receive debugging events from the corresponding remote system via a corresponding artifact worker.

According to trace debugging, an entire artifact is executed at S650 and the resulting debugging events and corresponding debugging session states are reviewable by the user thereafter. The dashed line of FIG. 6 represents interactive debugging, in which additional debugging actions received from the user (e.g., set breakpoints, execution play/pause commands) may control artifact execution.

Figure 7:
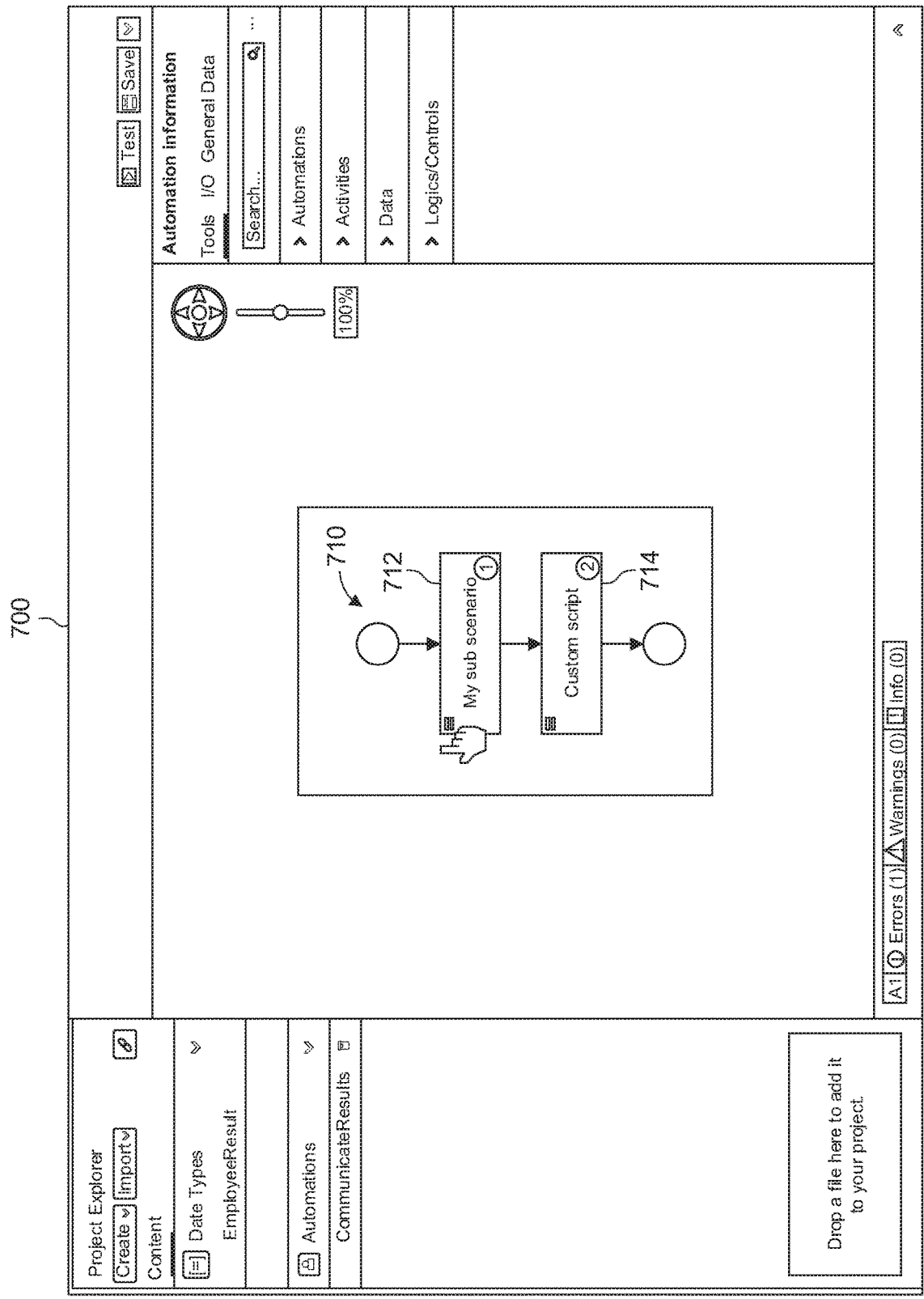
FIG. 7 is a view of a process editor user interface during debugging according to some embodiments.

FIG. 7 is a view of process editor user interface 700 during debugging according to some embodiments of FIG. 5 and/or FIG. 6. Advantageously, user interface 700 is similar to process editor user interface 300 in order to conform the debugging UI metaphor to the process editing UI metaphor. Like user interface 300, user interface 700 may also comprise a Web page provided by a design time UI executing in the cloud. User interface 700 may also be used to edit and/or debug an automation or other artifact in some embodiments.

Figure 8:
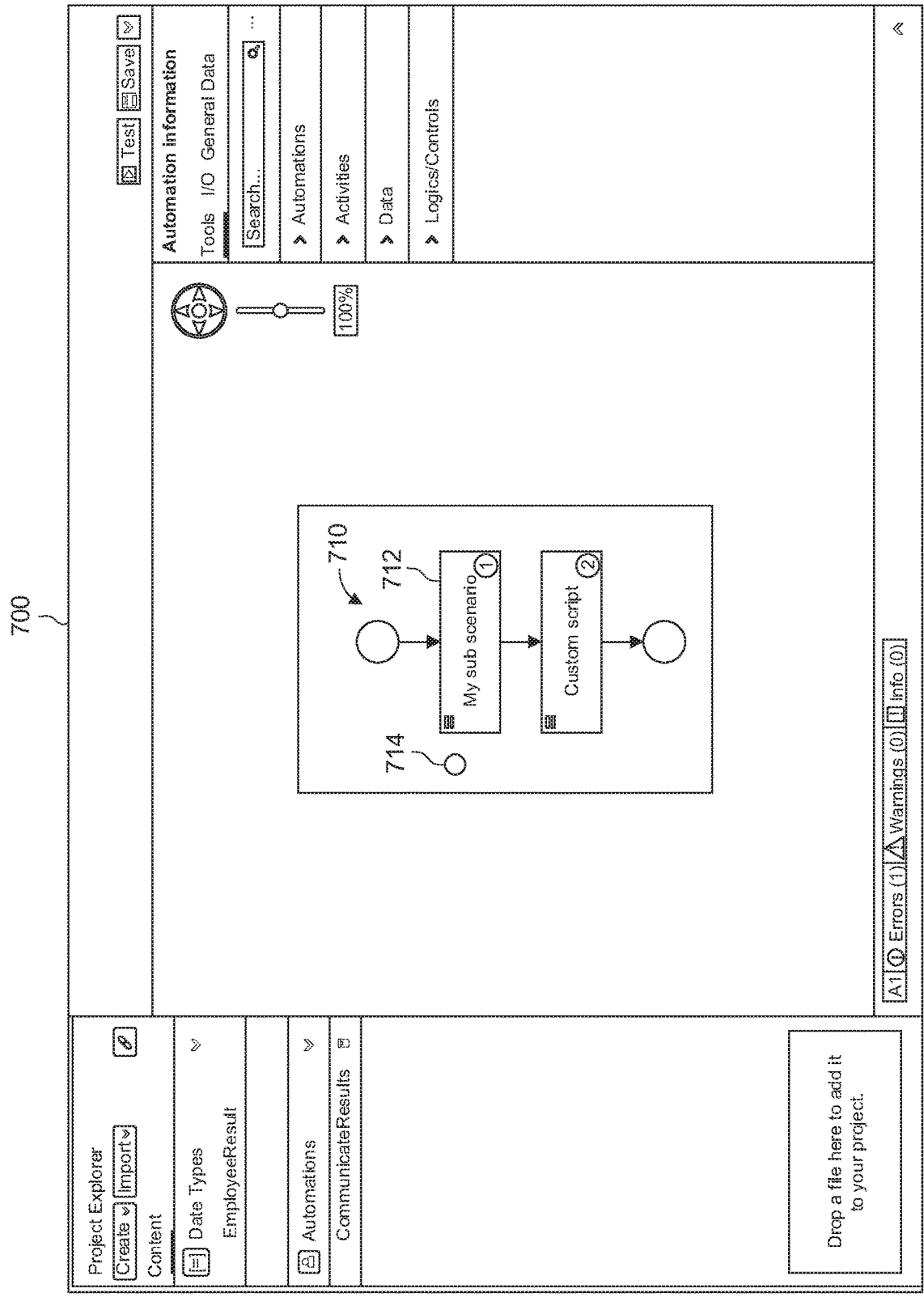
FIG. 8 is a view of a process editor user interface during debugging according to some embodiments.

FIG. 7 illustrates flow 710 of a process including activities 712 and 714. Activity 714 is implemented using a custom script. Cursor 720 is manipulated in order to set a debugging breakpoint with respect to activity 712. The breakpoint is represented by icon 714 of FIG. 8. Embodiments are not limited to any visual debugging metaphor.

Figure 9:
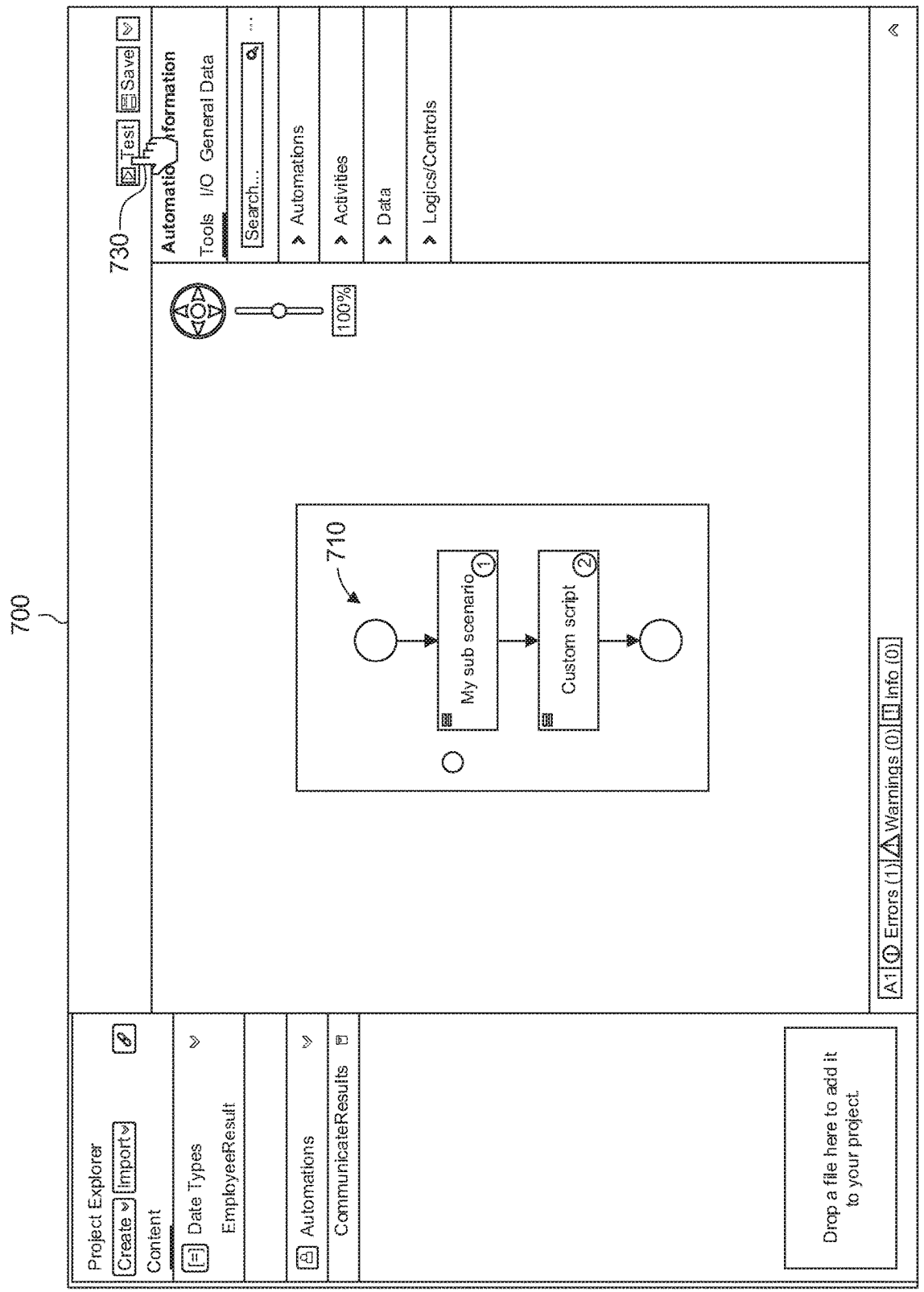
FIG. 9 is a view of a process editor user interface during debugging according to some embodiments.

After setting the breakpoint, the user may select Test control 730 as shown in FIG. 9. Selection of Test control 730 may comprise an instruction to a corresponding design time artifact worker to instruct a remote system to execute the process artifact, as described with respect to FIG. 5. Since flow 710 represents a process, the remote system may comprise a cloud-based system executing a process agent.

Figure 10:
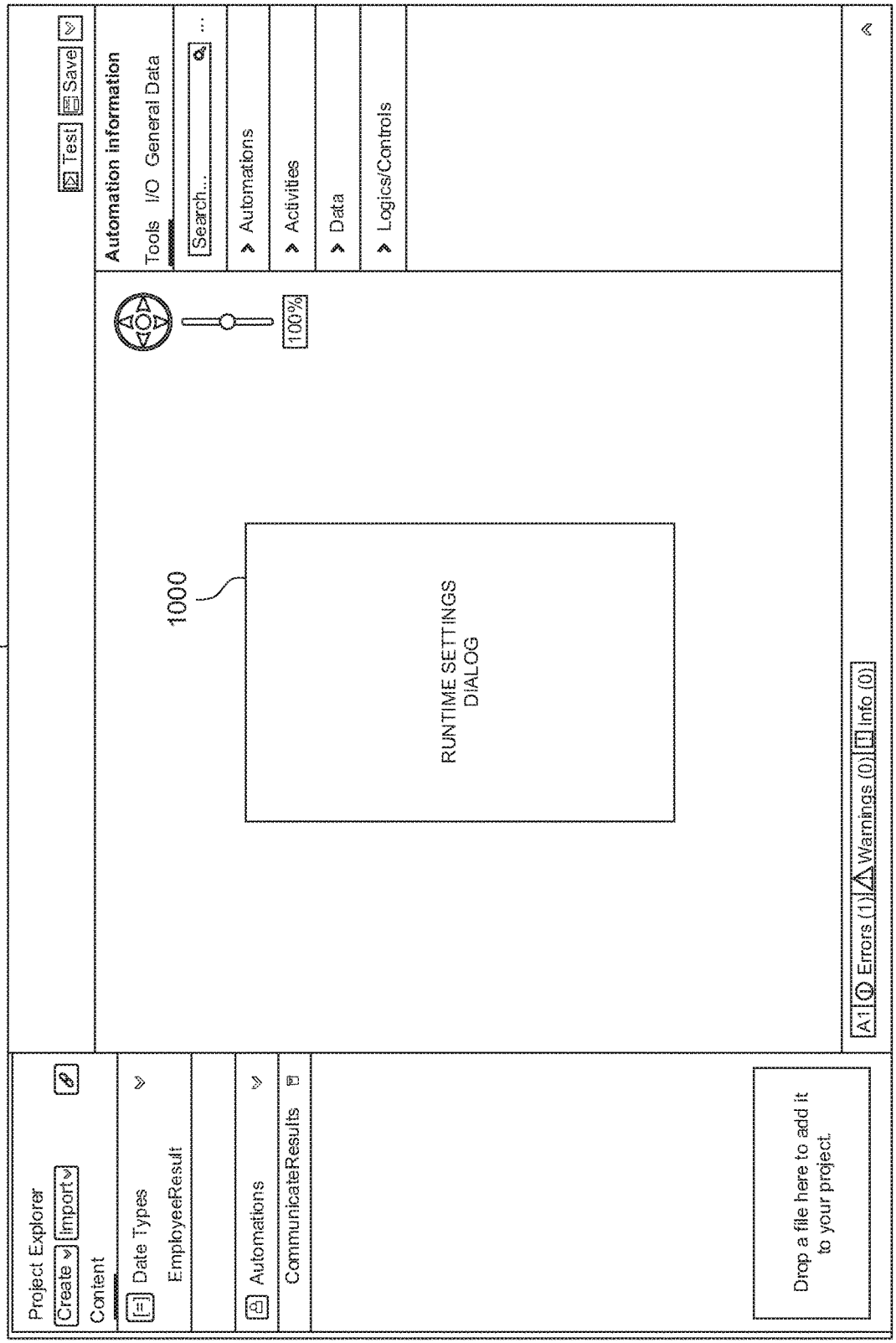
FIG. 10 is a view of a process editor user interface during debugging according to some embodiments.

FIG. 10 illustrates dialog 1000 which may be initially presented upon selection of Test control 730. Dialog 1000 may request and receive any setting needed for runtime execution of the process to be debugged. Examples of such runtime settings may include variable values, input files, etc.

Figure 11:
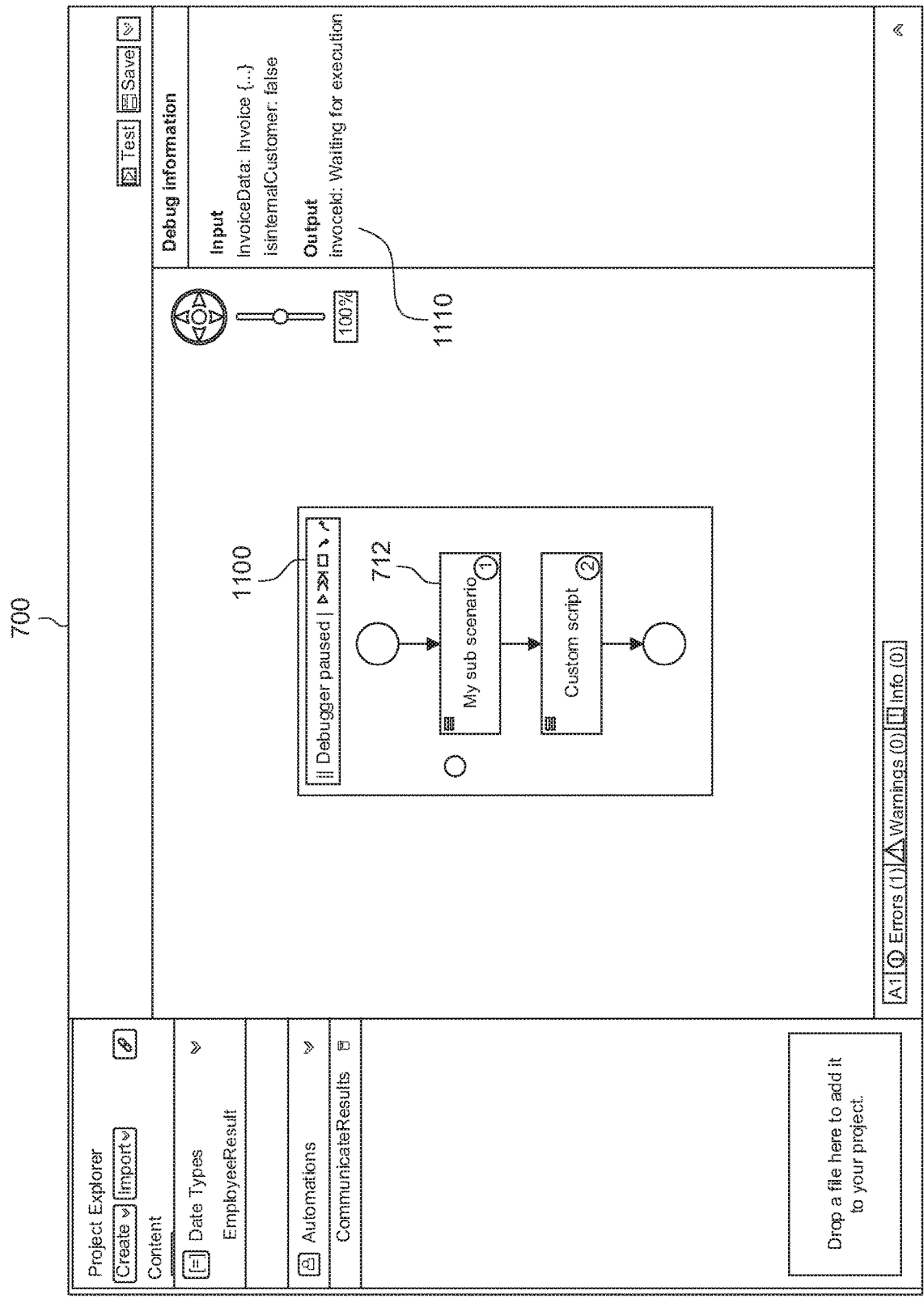
FIG. 11 is a view of a process editor user interface during debugging according to some embodiments.

After receiving any required runtime settings, the process is executed by the remote system and debugging information is provided to user interface 700 via a runtime backend as described above. In the case of FIG. 11, the artifact worker stops execution at the established breakpoint and corresponding debug information is provided to the runtime backend from the remote system. The runtime backend then provides the debug information to the artifact editor for display in debug information panel 1110 of user interface 700. User interface 700 also provides control panel 1100 to allow the user to control execution via commands passed from the artifact editor to the artifact worker as described above.

Figure 12:
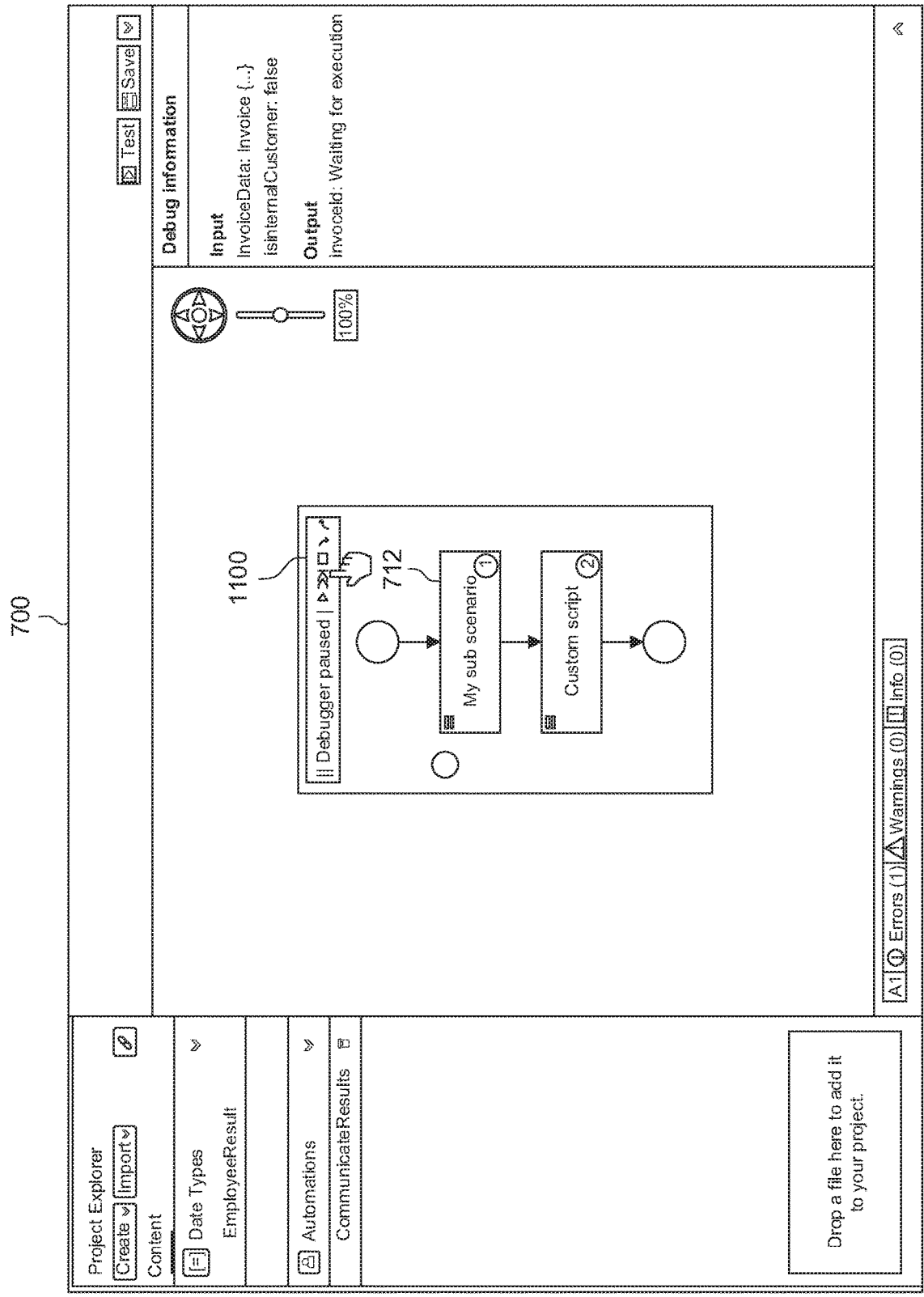
FIG. 12 is a view of a process editor user interface during debugging according to some embodiments.
Figure 13:
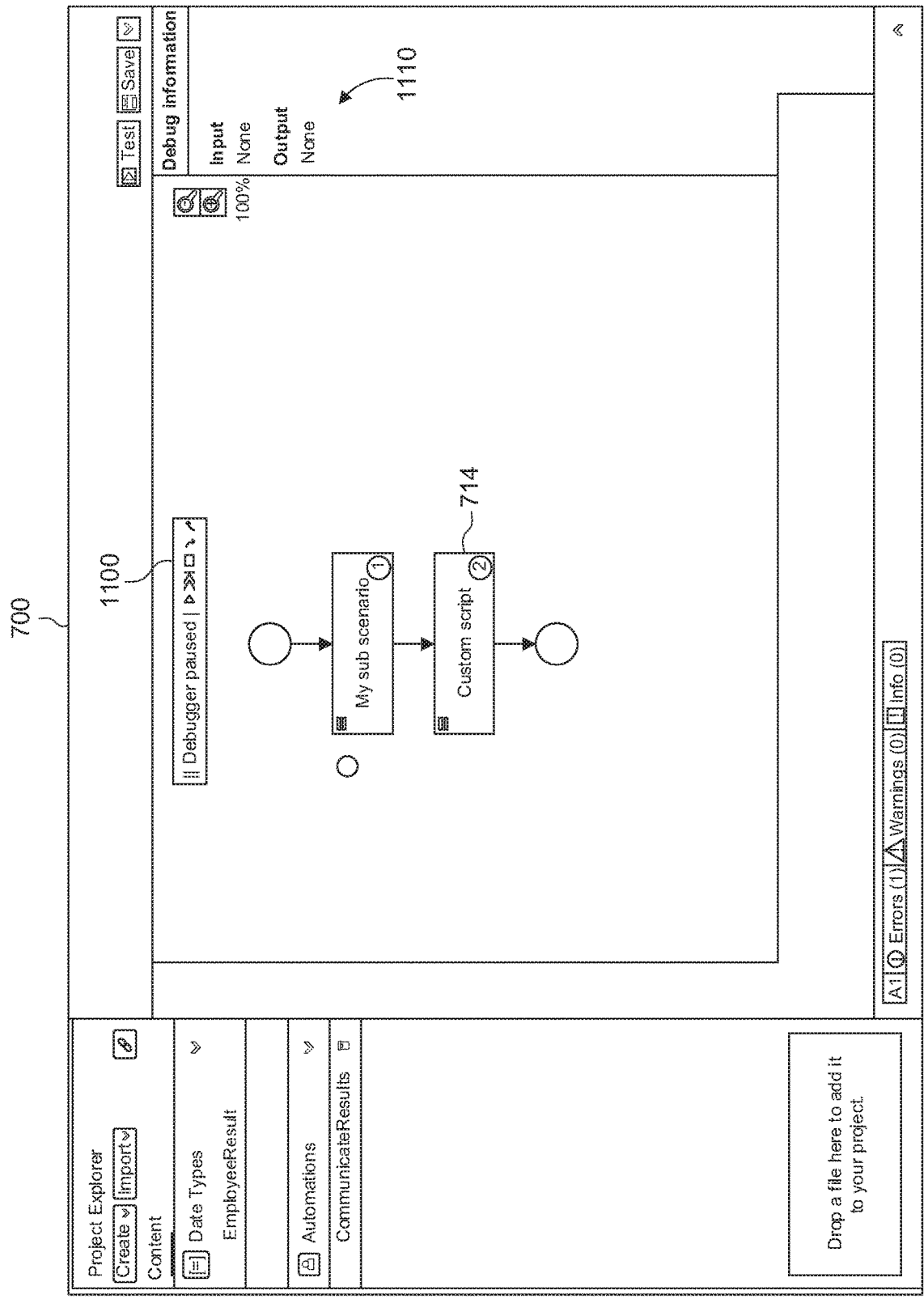
FIG. 13 is a view of a process editor user interface during debugging according to some embodiments.

In this regard, FIG. 12 illustrates selection of a Forward icon of control panel 1100 to move execution past the breakpoint. Accordingly, as shown in FIG. 13, execution moves to execute and debug custom script activity 714.

Figure 14:
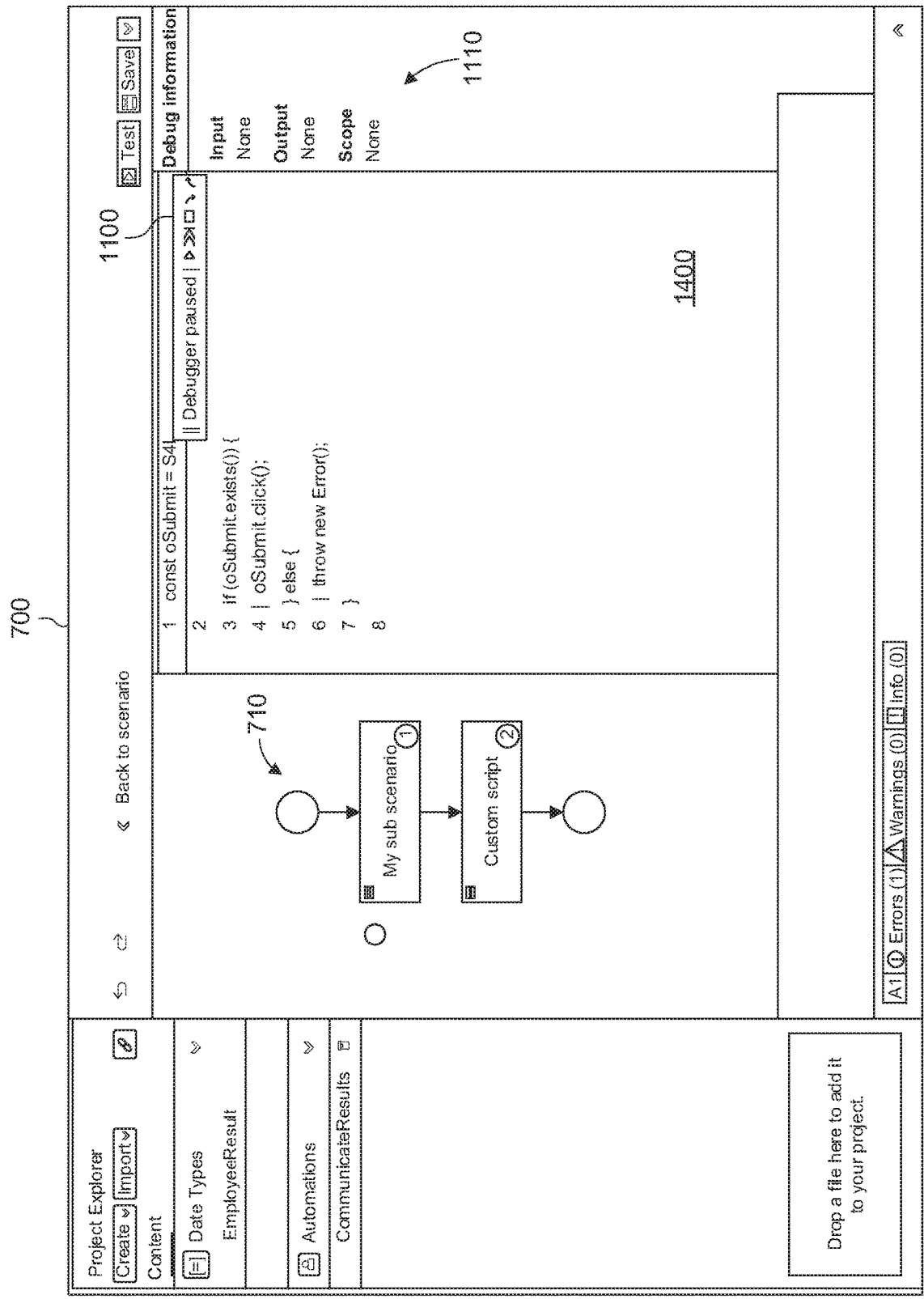
FIG. 14 is a view of a process editor user interface during debugging according to some embodiments.

FIG. 14 illustrate script debugging panel 1400 displayed by the artifact editor upon stepping into custom script activity 714. Again, embodiments may employ any suitable code debugging interface. Flow 710 has moved to the left of user interface 700 in order to provide context for the script displayed in panel 1400.

Figure 15:
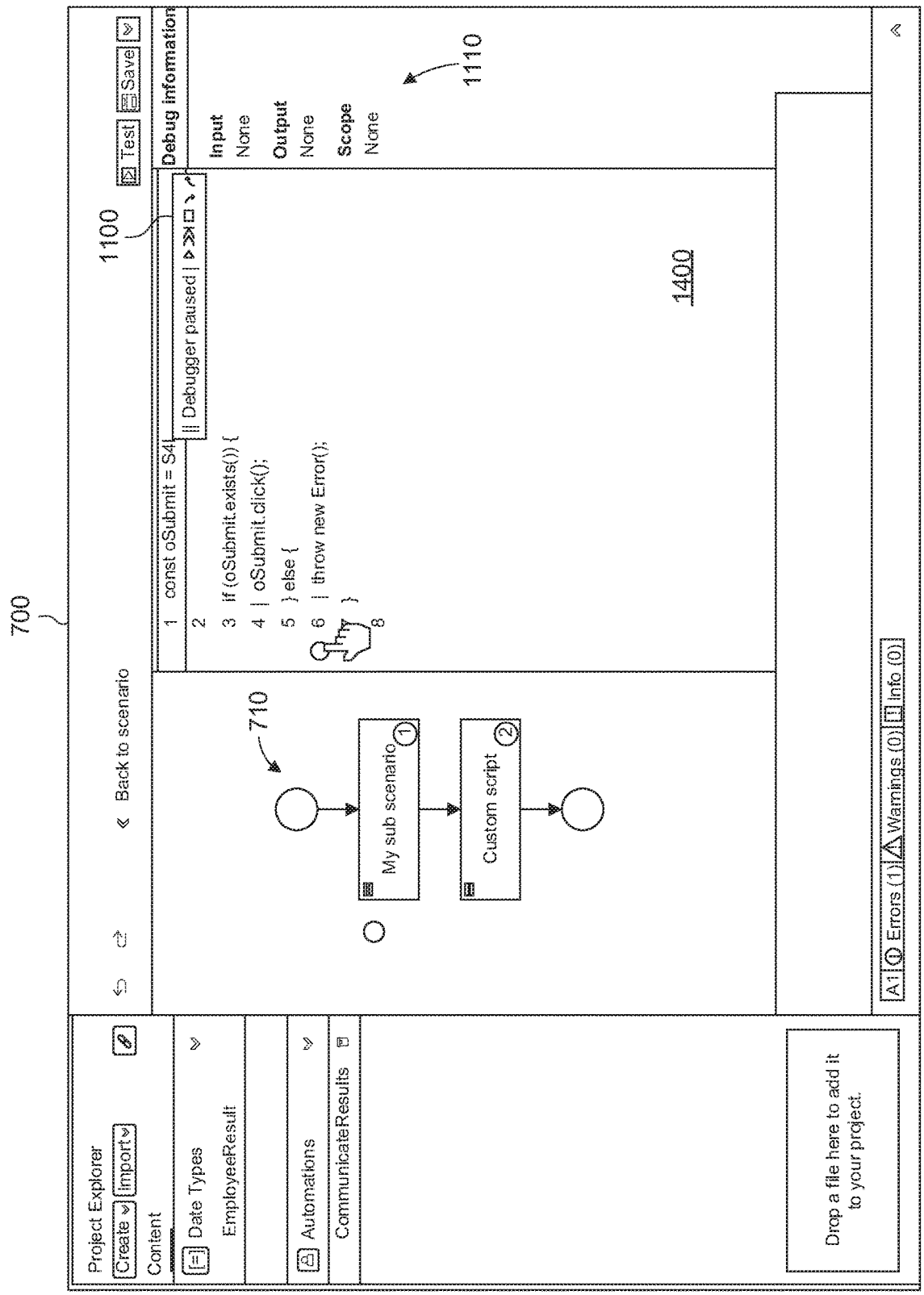
FIG. 15 is a view of a process editor user interface during debugging according to some embodiments.
Figure 16:
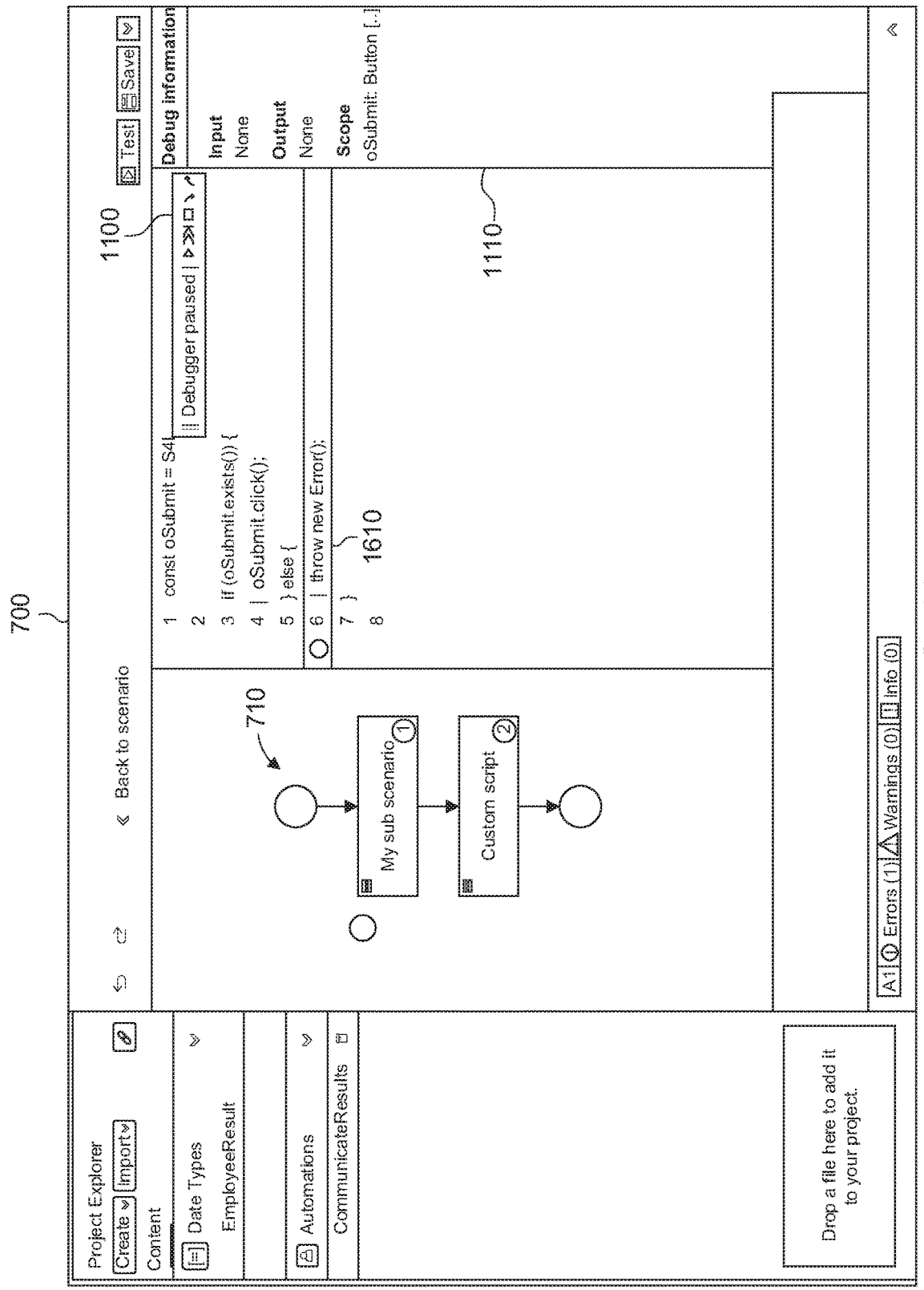
FIG. 16 is a view of a process editor user interface during debugging according to some embodiments.

Debugging of custom script activity 714 may proceed using any suitable script editing/debugging metaphor. FIG. 15 illustrates setting of a breakpoint at line 6 of the script, and FIG. 16 illustrates pausing of execution at the breakpoint, at which time panel 1110 shows current debug information. Control of execution with respect to the breakpoint may be provided via communication between the artifact editor and the artifact worker as described above. Moreover, the debug information shown in panel 1110 is provided to the artifact editor via the runtime backend as also described above.

FIGS. 7 through 16 illustrate interactive debugging which may be paused, may be restarted, supports breakpoints, etc. FIGS. 7 through 16 also illustrate seamlessly stepping into an instance of script editor-based debugging from an instance of graphical editor-based debugging. It should be noted that some embodiments allow a process or automation to call, or embed, another process or automation. In such embodiments, debugging may proceed by instantiating another graphical editor or code editor as needed to handle debugging of the embedded process or automation.

Figure 17:
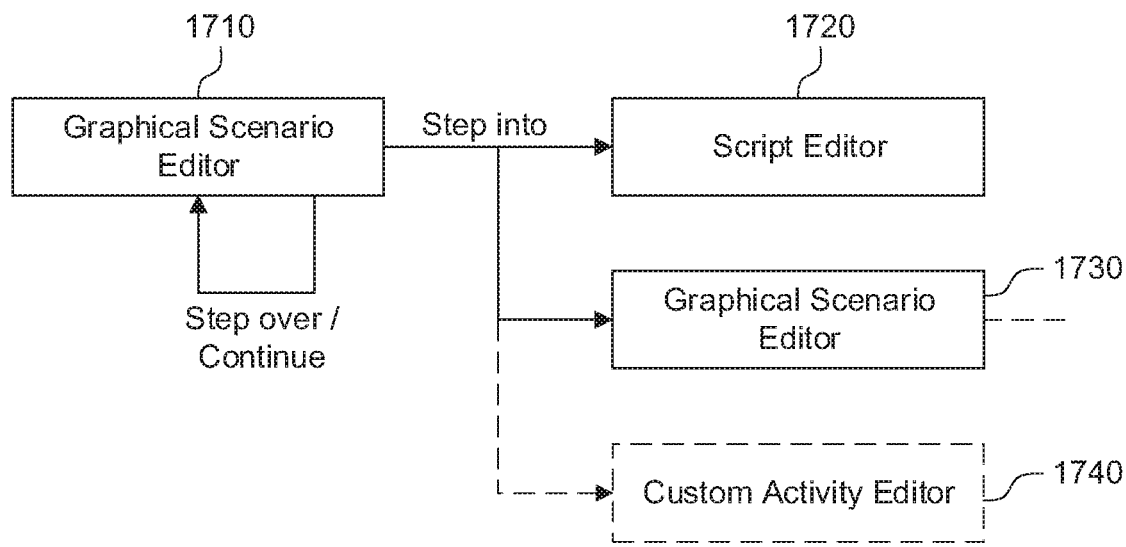
FIG. 17 is a block diagram illustrating relationships between editor instances during interactive debugging according to some embodiments.

FIG. 17 is a block diagram illustrating relationships between editor instances during interactive debugging according to some embodiments. As shown, a user may operate graphical scenario editor instance 1710 to execute debugging of graphically-edited (e.g., using a drag-and-drop metaphor) portions of an artifact such as an automation or process. For example, FIGS. 7 through 13 illustrate operation of a graphical scenario editor instance to execute debugging of a process.

Figure 18:
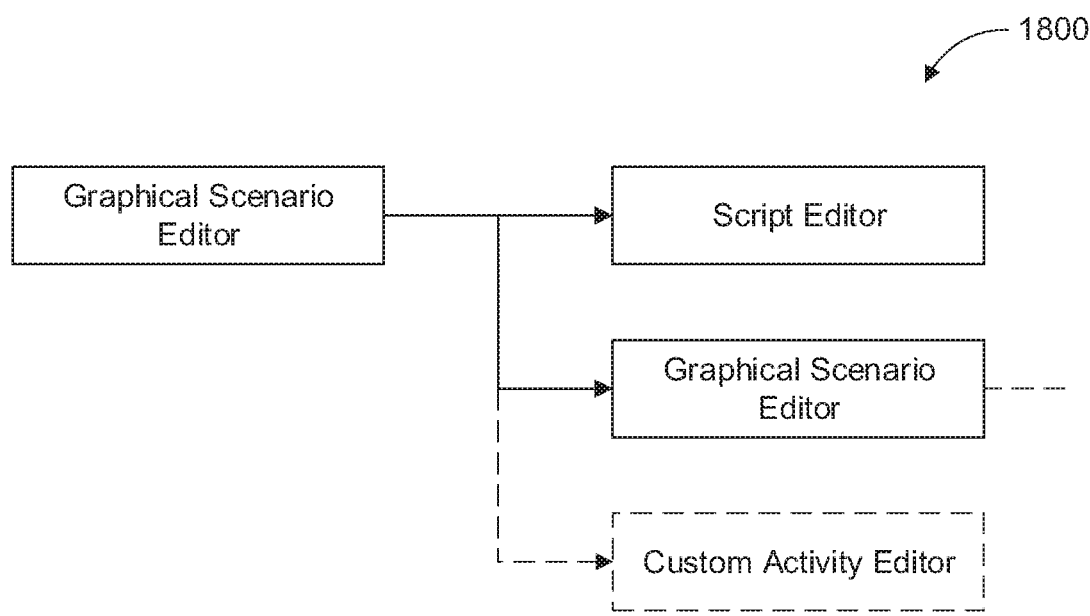
FIG. 18 is a block diagram illustrating relationships between editor instances during trace debugging according to some embodiments.

Upon reaching a step implemented by a custom script, embodiments support instantiation of script editor instance 1720 in order to provide debugging of the custom script, as illustrated in FIGS. 14 through 16. In a case that the artifact being debugged using graphical scenario editor instance 1710 includes another graphically-edited artifact, a second graphical scenario editor instance 1730 is instantiated to debug the other artifact. Embodiments are not limited to debugging using graphical scenario editors or script editors, as illustrated by dashed line of custom activity editor instance 1740. Embodiments may support further nested debugging, such that operation of graphical scenario editor instance 1730 to debug a nested artifact may result in instantiation of another editor instance to debug another artifact called by the nested artifact. FIG. 18 illustrates editor instances 1800 which may be instantiated when navigating through trace data acquired via trace debugging of an artifact according to some embodiments.

Figure 19:
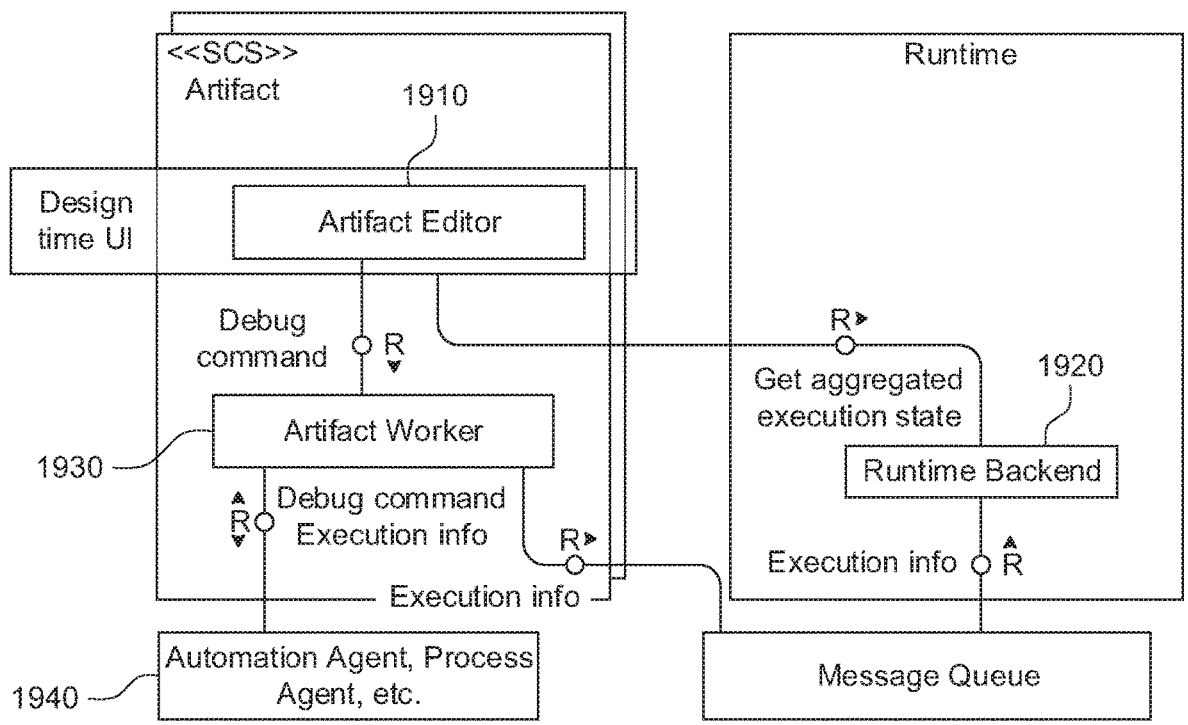
FIG. 19 illustrates transmission of debugging commands in a process automation system architecture according to some embodiments.

FIG. 19 illustrates transmission of debugging commands in a process automation system architecture according to some embodiments. As shown, cloud-based artifact editor 1910 receives aggregated execution information from cloud-based runtime backend 1920. Artifact editor 1910 also sends debug commands to artifact worker 1930 which forwards the debug commands to agent systems 1940 to control their execution of corresponding artifacts. In a case that agent system 1940 is a local system which is also in communication with artifact editor 1910 (e.g., via a local browser), debug commands pass from the browser executing on the local system to artifact editor 1910 and back to automation agent 1940 executing on the local system.

Figure 20:
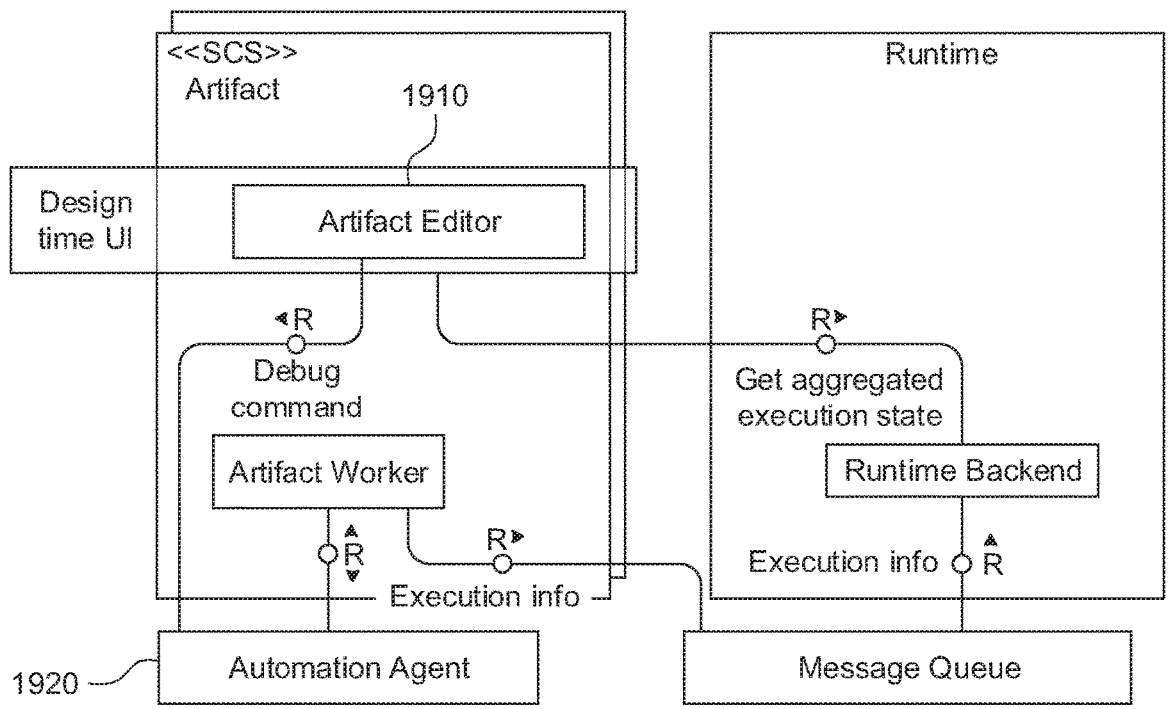
FIG. 20 illustrates transmission of debugging commands from a local editor to a local agent in a process automation system architecture according to some embodiments.

FIG. 20 illustrates transmission of debugging commands from a local editor to a local agent in a process automation system architecture according to some embodiments. For example, a pre-installed browser extension may capture any debug commands provided to artifact editor 1910 locally and provide those debug commands to local agent 1950. This shortcut avoids passing of debug commands from the browser executing on the local system to artifact editor 1910 and back to local agent 1950.

Figure 21:
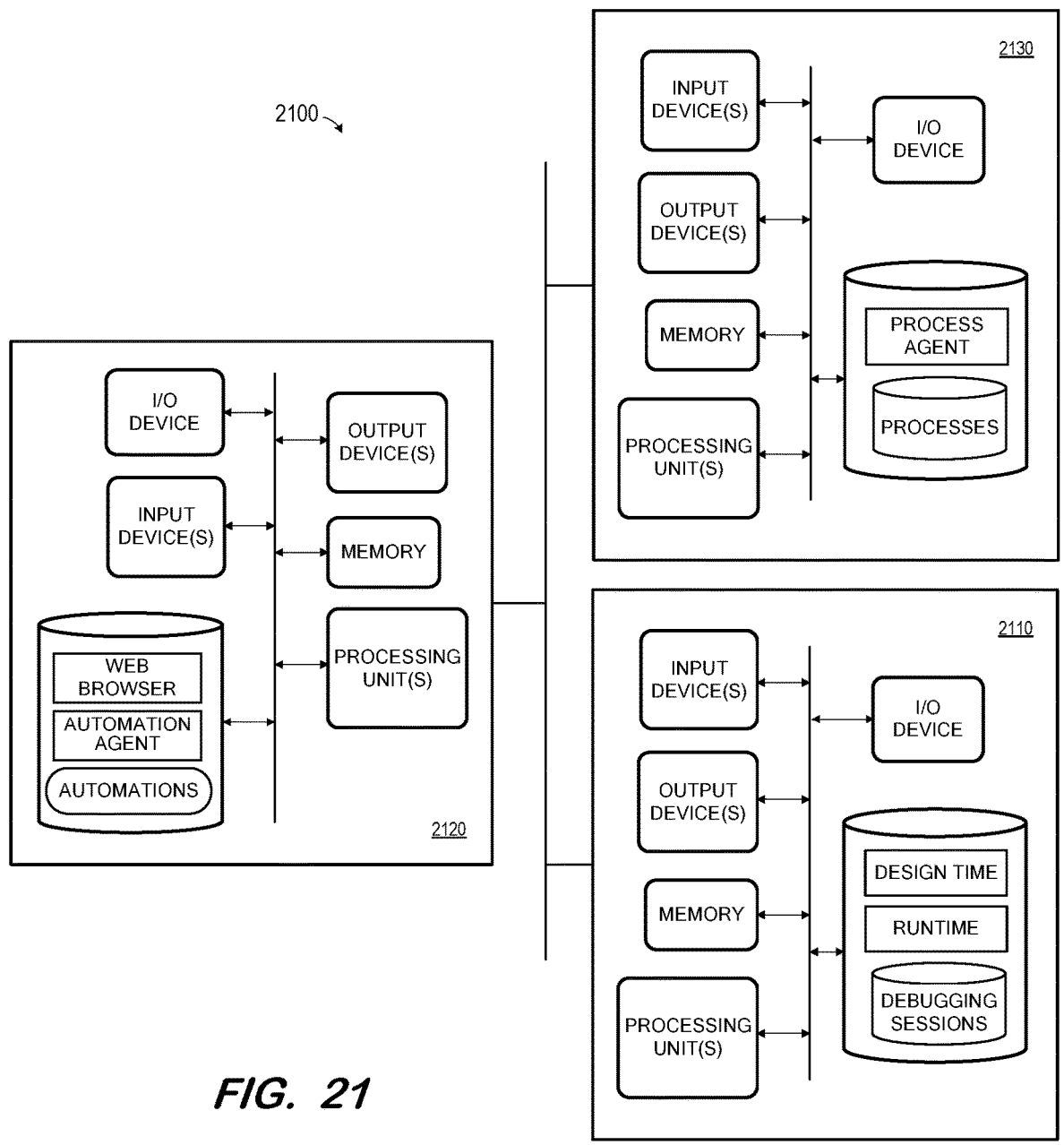
FIG. 21 is a block diagram of computing systems implementing a process automation system architecture according to some embodiments.

FIG. 21 is a block diagram of computing systems implementing a process automation system architecture according to some embodiments. System 2100 includes process automation system 2110 which may provide orchestration for distributing software jobs to local system 2120 for execution based on triggering initiated by cloud system 2130. Process automation system 2110 also provides for debugging of local and cloud-based software jobs (i.e., automations and processes) using a same user interface metaphor as used to create and edit the software jobs.

Process automation system 2110 includes a design time component for providing user interfaces to client applications to create, edit artifacts and debug artifacts and a runtime component to orchestrate execution of artifacts during debugging and normal operation. Local system 2120 includes processor-executable program code of a Web browser and an automation agent. The Web browser may be executed to communicate with the design time component of process automation system 2110 to create, edit and debug artifacts and the automation agent may execute stored automations and provide associated debugging events to the runtime component of system 2110. Cloud system 2130 includes processor-executable program code of a process agent to execute stored processes and also provide associated debugging events to the runtime component of system 2110. Each of systems 2110, 2120 and 2130 may comprise a general-purpose standalone or distributed computing system and may execute program code using processing unit(s) to perform any of the functions described herein.

All data storage mentioned herein may be provided via combinations of magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state volatile or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system having a memory comprising:
a process automation system comprising an automation artifact editor and a plurality of automation artifact workers, wherein each of the plurality of automation artifact workers operates as an artifact type-specific runtime orchestrator providing an interface between an automation artifact editor user interface and an automation agent; and
a local system comprising:
a client application to present the automation artifact editor user interface, to receive user manipulations of the automation artifact editor user interface, and to communicate with the automation artifact editor to create automation artifacts in a runtime environment based on the received user manipulations; and
the automation agent to receive the automation artifacts from an automation artifact worker of the plurality of automation artifact workers, and to execute the automation artifacts in response to first commands from the automation artifact worker,
wherein the client application is to communicate with the automation artifact editor to initiate debugging of a first automation artifact of the automation artifacts created in the runtime environment, wherein the debugging is executed in a debugging session created based on defined variables as needed by the execution of the runtime environment and data replicated from the runtime environment, the debugging is based on receipt at the automation artifact editor user interface of an instruction to initiate the debugging of the first automation artifact and, in response, the automation artifact worker creates in the debugging session a debug package including an immutable version of the first automation artifact created in the runtime environment, instructs the automation agent to execute the first automation artifact in a debug mode and the client application presents debug information associated with the execution of the first automation artifact via the automation artifact editor user interface.

2. The system according to claim 1, the process automation system further comprising a runtime backend to receive the debug information from the automation artifact worker and to store the debug information, wherein the automation artifact editor requests the debug information from the runtime backend.

3. The system according to claim 1, wherein, during the execution of the first automation artifact, the automation artifact editor provides commands to the automation artifact worker to control the execution of the first automation artifact.

4. The system according to claim 3, wherein the commands from the automation artifact editor include a command to set a breakpoint.

5. The system according to claim 1, wherein the process automation system further comprises a process artifact editor and a process artifact worker,
wherein the client application is to present a process artifact editor user interface, to receive user manipulations of the process artifact editor user interface, and to communicate with the process artifact editor to create process artifacts based on the received user manipulations of the process artifact editor user interface, the system further comprising:
a cloud-based system comprising a process agent to receive the process artifacts from the process artifact worker and to execute the process artifacts in response to second commands from the process artifact worker,
wherein the client application is to communicate with the process artifact editor to initiate debugging of a first process artifact and, in response, the process artifact worker instructs the process agent to execute the first process artifact and the client application presents debug information associated with the execution of the first process artifact via the process artifact editor user interface.

6. The system according to claim 5, the process automation system further comprising a runtime backend to receive the debug information associated with the execution of the first process artifact from the process artifact worker, and wherein the process artifact editor requests the debug information associated with the execution of the first process artifact from the runtime backend.

7. The system according to claim 6, wherein, during the execution of the first process artifact, the process artifact editor provides commands to the process artifact worker to control the execution of the first process artifact.

8. A computer-implemented method comprising:
receiving, at an automation artifact editor of a process automation system, user manipulations of an automation artifact editor user interface displayed on a client application of a local system;
creating, in a runtime environment and by the automation artifact editor, an automation artifact based on the received user manipulations;
receiving, at the automation artifact editor, second user manipulations of the automation artifact editor user interface displayed on the client application, the second user manipulations to initiate debugging of the automation artifact created in the runtime environment, wherein the debugging is executed in a debugging session created based on defined variables as needed by the execution of the runtime environment and data replicated from the runtime environment;
creating, in the debugging session, a debug package including an immutable version of the automation artifact created in the runtime environment;
instructing, by an automation artifact worker of a plurality of automation artifact workers, of the process automation system and in response to the second user manipulations, an automation agent of the local system to execute the automation artifact in a debug mode, wherein each of the plurality of automation artifact workers operates as an artifact type-specific runtime orchestrator providing an interface between the automation artifact editor user interface and the automation agent; and
presenting, by the automation artifact editor user interface displayed on the client application, debug information associated with the execution of the automation artifact.

9. The method according to claim 8 further comprising:
receiving the debug information from the automation artifact worker at a runtime backend of the process automation system; and
storing the debug information at the runtime backend,
wherein the automation artifact editor requests the debug information from the runtime backend.

10. The method according to claim 8 further comprising:
providing, during the execution of the automation artifact and by the automation artifact editor, commands to the automation artifact worker to control the execution of the automation artifact by the automation agent.

11. The method according to claim 10, wherein the commands include a command to set a breakpoint.

12. The method according to claim 8 further comprising:
receiving, at a process artifact editor of the process automation system, user manipulations of a process artifact editor user interface displayed on the client application;
creating, by the process artifact editor, a process artifact based on the received user manipulations of the process artifact editor user interface;
receiving, at the process artifact editor, second user manipulations of the process artifact editor user interface displayed on the client application, the second user manipulations of the process artifact editor user interface to initiate debugging of the process artifact;
instructing, by a process artifact worker of the process automation system and in response to the second user manipulations of the process artifact editor user interface, a process agent of the local system to execute the process artifact; and
presenting, by the process artifact editor user interface displayed on the client application, debug information associated with the execution of the process artifact.

13. The method according to claim 12 further comprising:
receiving the debug information associated with the execution of the process artifact from the process artifact worker at a runtime backend of the process automation system; and
storing the debug information associated with the execution of the process artifact at the runtime backend,
wherein the process artifact editor requests the debug information associated with the execution of the process artifact from the runtime backend.

14. The method according to claim 12 further comprising:
providing, during the execution of the process artifact and by the process artifact editor, commands to the process artifact worker to control the execution of the process artifact by the process agent.

15. A system comprising:
a memory storing processor-executable program code;
a processing unit to execute the processor-executable program code to cause the system to:
receive, at an artifact editor of a process automation system, user manipulations of an artifact editor user interface displayed on a client application of a local system;
create, in a runtime environment and by the artifact editor, an artifact based on the received user manipulations;
receive, at the artifact editor, second user manipulations of the artifact editor user interface displayed on the client application, the second user manipulations to initiate debugging of the artifact created in the runtime environment, wherein the debugging is executed in a debugging session created based on defined variables as needed by the execution of the runtime environment and data replicated from the runtime environment;
create, in the debugging session, a debug package including an immutable version of the artifact created in the runtime environment;
instruct, by an artifact worker of a plurality of artifact workers, of the process automation system and in response to the second user manipulations, a remote agent to execute the artifact in a debug mode, wherein each of the plurality of artifact workers operates as an artifact type-specific runtime orchestrator providing an interface between the artifact editor user interface and the remote agent; and
present, by the artifact editor, debug information associated with the execution of the artifact via display on the artifact editor user interface on the client application.

16. The system according to claim 15, the processor-executable program code further executable to cause the system to:
receive the debug information from the artifact worker at a runtime backend of the process automation system; and
store the debug information,
wherein the artifact editor requests the debug information from the runtime backend.

17. The system according to claim 15, the processor-executable program code further executable to cause the system to:
provide, during the execution of the artifact and by the artifact editor, commands to the artifact worker to control the execution of the artifact by the remote agent.

18. The system according to claim 17, wherein the commands include a command to set a breakpoint.

19. The system according to claim 15, wherein the artifact is an automation artifact, and the remote agent is an automation agent executed by the local system.

20. The system according to claim 15, wherein the artifact is a process artifact and the remote agent is a process agent executed by a cloud system.

* * * * *